(12) United States Patent
Chen et al.

(10) Patent No.: US 7,746,843 B2
(45) Date of Patent: Jun. 29, 2010

(54) METHOD OF PROVIDING RELIABLE TRANSMISSION QUALITY OF SERVICE IN A COMMUNICATION NETWORK

(75) Inventors: Yuepeng Chen, Shenzhen (CN); Lingyuan Fan, Shenzhen (CN); Ting Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 805 days.

(21) Appl. No.: 10/566,739

(22) PCT Filed: Jul. 27, 2004

(86) PCT No.: PCT/CN2004/000870
§ 371 (c)(1),
(2), (4) Date: Oct. 10, 2006

(87) PCT Pub. No.: WO2005/013553
PCT Pub. Date: Feb. 10, 2005

(65) Prior Publication Data
US 2007/0053363 A1  Mar. 8, 2007

(30) Foreign Application Priority Data
Aug. 1, 2003  (CN)  .................... 03143770

(51) Int. Cl.
*H04L 12/28* (2006.01)
*H04L 12/66* (2006.01)

(52) U.S. Cl. .................. 370/351; 370/352; 370/401; 370/392

(58) Field of Classification Search .......... 370/352, 370/401, 353, 252, 340, 351, 328, 389, 392, 370/395.2, 395.21, 400; 709/226, 239–242, 709/231, 228
See application file for complete search history.

(56) References Cited
U.S. PATENT DOCUMENTS
5,461,611 A  10/1995  Drake, Jr. et al. ............. 370/54

(Continued)

FOREIGN PATENT DOCUMENTS
CN  1274221  11/2000

(Continued)

OTHER PUBLICATIONS

Chimento et al., "Final Report," QBone Signaling Design Team, retrieved from the Internet on Aug. 24, 2006: URL http://qos.internet2.edu/wg/documents-informational/20020709-chimento-equal-gbone-signaling.

(Continued)

*Primary Examiner*—Ayaz R Sheikh
*Assistant Examiner*—Chuong T Ho
(74) *Attorney, Agent, or Firm*—Finnegan, Henderson, Farabow, Garrett & Dunner LLP (57) ABSTRACT

A method is disclosed for providing reliable transmission Quality of Service (QoS) in communication network, in which a QoS connection is established between bearer network resource managers in bearer network control layer, and maintenance management mechanism is well established in terms of the QoS connection. Various QoS resource control messages can be carried through this established QoS connection, so that request of service bandwidth application of the user and the result thereof, as well as the path information allocated by bearer network resource managers can be transferred. The disclosed method is reliable and easy to implement and maintain, with good controlled quality, and can implement resource synchronization between bearer network resource managers. Therefore, implementation of the disclosed method makes it more convenient to manage resources of bearer network uniformly, and provides technical support on guaranteeing transmission reliability of important services.

15 Claims, 4 Drawing Sheets

U.S. PATENT DOCUMENTS

| | | | |
|---|---|---|---|
| 6,145,006 A * | 11/2000 | Vishlitsky et al. | 709/229 |
| 7,106,718 B2 * | 9/2006 | Oyama et al. | 370/340 |
| 7,319,691 B2 * | 1/2008 | Qing et al. | 370/351 |
| 2002/0147828 A1 * | 10/2002 | Chen et al. | 709/231 |
| 2003/0009580 A1 * | 1/2003 | Chen et al. | 709/231 |
| 2003/0093526 A1 * | 5/2003 | Nandagopalan et al. | 709/225 |
| 2005/0007981 A1 * | 1/2005 | Suomi | 370/331 |
| 2005/0152286 A1 * | 7/2005 | Betts et al. | 370/255 |

FOREIGN PATENT DOCUMENTS

| WO | WO 00/36846 | 6/2000 |
|---|---|---|
| WO | WO 01/50790 | 7/2001 |

OTHER PUBLICATIONS

Goodloe et al., "Authenticated Traversal," retrieved from the Internet on Aug. 25, 2006: URL <http://66.102.9.104/search?q=cache:4CVmI0X8s1MJ:www.cis.upenn.edu/~gunter/dlist/ast.pdf+%22authenticated+syn+traversal%22&h1=de&gl=ct=clnk&cd=3>.

European Office Action for Application No. 06127301.7-2416, dated Mar. 16, 2007.

European Search Report for Application No. 06127301.7-2416, dated Aug. 27, 2007.

International Search Report for PCT/CN2004/000870, dated Nov. 4, 2004.

* cited by examiner

FIG. 7 ental Application No. PCT/CN2004/000870, which was filed on
METHOD OF PROVIDING RELIABLE TRANSMISSION QUALITY OF SERVICE IN A COMMUNICATION NETWORK

CROSS REFERENCES TO RELATED APPLICATIONS

This application is the national phase of International Application No. PCT/CN2004/000870, which was filed on Jul. 27, 2004, and which, in turn, claimed the benefit of Chinese Patent Application No. 03143770.2, which was filed Aug. 1, 2003, the entire disclosures of which are hereby incorporated by reference.

FIELD OF THE TECHNOLOGY

The present invention relates to network communication technique field, more particularly to a method for providing reliable transmission quality of service in communication network.

BACKGROUND OF THE INVENTION

With the development of Internet technology, the networks are of ever increasing scales, various network services emerge and so do advanced multimedia systems. Because real-time services like multimedia service are generally sensitive to network transmission delay, delay jitter and other characteristics, when there is File Transfer Protocol (FTP) service with high burst possibility or Hyper Text Transfer Protocol (HTTP) service with image files, transmission performance of real-time services will be greatly affected; for another, multimedia services in communication networks can occupy large amount of bandwidths, so that key services asking the network for transmission quality may not be transmitted reliably.

Based on the above-mentioned requirement, various techniques providing Quality of Service (QoS) guarantee for service transmission emerge as the times require. To meet the Qos demand of transmission, Internet Engineering Task Force (IETF) has put forward some service models and mechanisms. At present, utilizing Diff-Serv model in core of the network is widely accepted by the prior art thereof. Diff-Serv model adopts the measure of setting priority levels to guarantee transmission QoS, although this measure can increase utility rate of bandwidth resource, specific application effect is hard to predict due to lack of corresponding maintenance and management message interaction.

Therefore, an independent bearer control layer is introduced into backbone network Diff-Serv model to manage resources of the bearer network. For instance, to prompt application of Diff-Serv model, in the QoS Backbone (Qbone) experimental networks driven by IETF and some manufacturers as well as research organizations, bearer network resource managers are used to implement resource and topology management in bearer network, namely to manage topology resources and coordinate QoS capabilities of Diff-Serve model areas. This kind of Diff-Serve manner that implements said resource management is right the Diff-Serve model with independent bearer control layer.

In a Diff-Serve model with independent bearer control layer, resource management rules and network topology structure of bearer network connection nodes are configured inside bearer network resource manager, and bearer, network resource manager takes charge of allocating bandwidth resources on the user's request of service bandwidth application. Request of service bandwidth application and result of the user as well as path information allocated by bearer network resource managers for the service are transferred through signaling between each bearer network resource manager.

When processing the user's request of service bandwidth application, bearer control layer determines path of the user service, and bearer network resource manager notifies edge routers, namely connection nodes of the bearer network, to transfer the service stream according to the specified path.

To meet the message transmission requirements between bearer network resource managers, Internet2 specifically defines corresponding Bandwidth Broker (BB), Call Agent (CA) or Connection Management (CM) for each Diff-Serve model management domain as bearer network resource managers; therein said bandwidth broker takes charges in processing the requests of bandwidth application from user hosts or service servers or network maintainers, wherein the bandwidth broker determines whether to permit the user's bandwidth application according to resource reservation status of current network and configuration policy as well as Service Level Agreement (SLA); said call agent acts as a service server which is used to access the user's call to the communication network; said connection manager is used for service layer controlling bearer network layer according to service requirements.

But there are some problems in the above-described Diff-Serv model that is based on bandwidth broker and with independent bearer control layer, for example, Simple Inter-domain Bandwidth Broker Signaling (SIBBS) is adopted between bandwidth brokers to implement the resource request, wherein this signaling is only used between bandwidth brokers and there is no resource synchronization mechanism between bandwidth brokers, namely that resource requests are transmitted through SIBBS directly without the procedure of session establishment or maintenance either without message interaction mechanism used for maintenance and management.

At present, there is no mature technical solution in the prior art to transfer request of service bandwidth application and result of the user as well as path information allocated for service request by bearer network resource manager, etc.

SUMMARY OF THE INVENTION

In accordance with one aspect of the disclosure, a method is useful for providing reliable transmission Quality of Service (QoS) in the communication network, so as to guarantee that effective management upon the whole network resource can be implemented in bearer network and guarantee reliable transmission of important services in the network.

In accordance with another aspect of the disclosure, a method for providing reliable transmission QoS in the communication network includes the steps of:

A. creating a QoS connection between bearer network resource managers in the communication network;

B. exchanging and negotiating the QoS information, which the communication network should provide during the data transmission procedure, among the bearer network resource managers through the QoS connection; and C. according to the QoS information sent by the bearer network resource manager, the connection node connected to this bearer network resource manager providing corresponding resource.

The bearer network resource manager may be located in a bearer control layer of the multiservice network.

Step A may include the following steps for establishing the connection initially:

A1. a local bearer network resource manager that initiates the create connection procedure sending a establish connection request to a peer bearer network resource manager; and A2. the peer bearer network resource manager responding to the creating connection request and creating the QoS-based connection.

The disclosed method may further include, before step A2, the peer bearer network resource manager judging whether identity of local bearer network resource manager is valid, and if valid, executing step A2, and otherwise, returning a message of unable to create the connection to local bearer network resource manager.

The information carried in the creating connection request may include identification and authentication information of the bearer network resource manager initiating the creating connection request.

The disclosed method may further include the following steps after step A2:

A3. Local bearer network resource manager periodically sending handshake message to peer bearer network resource manager, and determining the connection status according to the handshake response returned by peer bearer network resource manager.

Step A3 may include the following steps:

A31. creating local Keep Active (KA) timer at local bearer network resource manager, and creating peer Keep Active (KA) time at peer bearer network resource manager;

A32. when local KA timer is timeout, local bearer network resource manager adding 1 to timeout times of local KA timer and sending a handshake message to peer bearer network resource manager;

A33. after receiving the handshake message, peer bearer network resource manager restarting peer KA timer and returning a handshake response to local bearer network resource manager; and A34. local bearer network resource manager determining the created QoS connection status according to timeout times of the local KA timer, peer bearer network resource manager determining the QoS connection status according to whether peer KA timer is timeout.

The information carried in the handshake message may include connection ID and connection resource state information.

Step B may include local bearer network resource manager interacting with peer bearer network resource manager through a plurality of intermediate bearer network resource managers, and the intermediate bearer network resource manager only taking charge in message transfer.

The disclosed method may further include after step B the bearer network resource manager that finally receives the QoS information managing and controlling resources of the connection node under its control according to the received QoS information.

Step B may include the following steps:

B1. local bearer network resource manager sending QoS resource control message that carries the QoS information to the connection nodes under its control as well as to peer bearer network resource manager;

B2. peer bearer network resource manager sending QoS resource control policy to the connection node according to the received QoS resource control message;

B3. after receiving the QoS resource control policy, the connection node returning a response of QoS resource control policy to the peer bearer network resource manager;

B4. peer bearer network resource manager returning a response of the QoS resource control message to local bearer network resource manager.

The QoS resource control message in step B1 may include QoS resource request information, which carries information like connection identification, stream information, QoS parameters and stream descriptor.

The QoS resource control message in step B1 may include a QoS resource release request, which carries information like connection identifier and reason code.

The QoS resource control message in step B1 may include a QoS resource modify request, which carries information like connection identifier and the modified parameter information corresponding to the QoS resource connection.

The QoS resource control message in step B1 may include a connection status inquiry message, and step B4 may include, after receiving the response from the connection node, peer bearer network resource manager checking resource consistency of the created QoS connection, and returning a response of the connection status inquiry message to local bearer network resource manager according to the check result.

The information carried in the response of connection status inquiry message may include a connection identifier, stream information, QoS parameters, stream descriptor, label stack, path maximum transmission unit, or bearer network resource manager stack, or any combination of the above elements.

The message may further carry information like data consistency information.

The data consistency information may include parameter global path maximum transmission unit, global label stack depth, intra-domain label stack depth and stream description.

The connection node may be a router.

The bearer network resource manager may be a bandwidth broker, a call agent, or a connection manager.

It can be seen from above-described technical scheme that, QoS connections are established between bearer network resource managers in control layer of the bearer network, and the established QoS connections are maintained and managed, wherein online QoS connections can bear various QoS resource control messages and transfer the messages among bearer network resource managers of bearer network control layer, so as to transfer bandwidth request and result of the service as well as path information allocated for the service request and so on. The method for establishing QoS connections between bearer network resource managers provided by the present invention are easy to implement, and said QoS connections are easy to maintain and control.

The present invention also implements resource synchronization mechanism and operation maintenance mechanism between bearer network resource managers, overcoming the disadvantage of utilizing SIBBS signaling to implement resource request in the prior art that resource synchronization mechanism cannot be implemented between bandwidth brokers. In addition, the present invention also implements resource requests transfer and status report transfer between local bearer network resource manager and peer bearer network resource manager, so that performance of the established QoS connections are improved. Therefore, the present invention makes it convenient to uniformly manage resources of bearer network and provides technical support to guarantee reliable transmission of important services in the network.

EMBODIMENTS OF THE INVENTION

The present invention will be illustrated hereinafter with reference to the embodiment and the accompanying drawings.

Two problems are resolved in the present invention, one problem is Quality of Service (QoS) connections cannot be established between CM or between CA and CM through signaling, and the other problem is that there is no resource synchronization mechanism between Bandwidth Brokers (BB) because SIBBS is adopted to implement resource requests in the prior art.

The disclosed method is useful for providing reliable transmission QoS in communication networks. Reliable transmission of QoS resource control messages between bearer network resource managers is implemented in communication networks, and each bearer network resource manager provides requested QoS for corresponding services by taking use of the QoS resource control messages, so that corresponding transmission QoS can be reliably provided according to transmission request of the service. First of all, QoS connections between bearer network resource managers should be created in the present invention, and the QoS connections are used to transfer QoS resource control messages. In addition, resource request and status report between bearer network resource managers are also implemented in the present invention, which further enhances the reliability of providing corresponding transmission QoS in communication networks.

In this way, the present invention realizes QoS resource control message transfer between entities including BB, CA and CM, and the transfer procedure comprises the whole processing procedures such as establishing the connection and maintaining the connection, it can be deemed that the present invention is implemented based on Connection Initialization Protocol (RCIP), and the specific processing procedure of implementing the present invention based on RCIP will be described in detail hereinafter with reference to the following description.

Figure 1A:
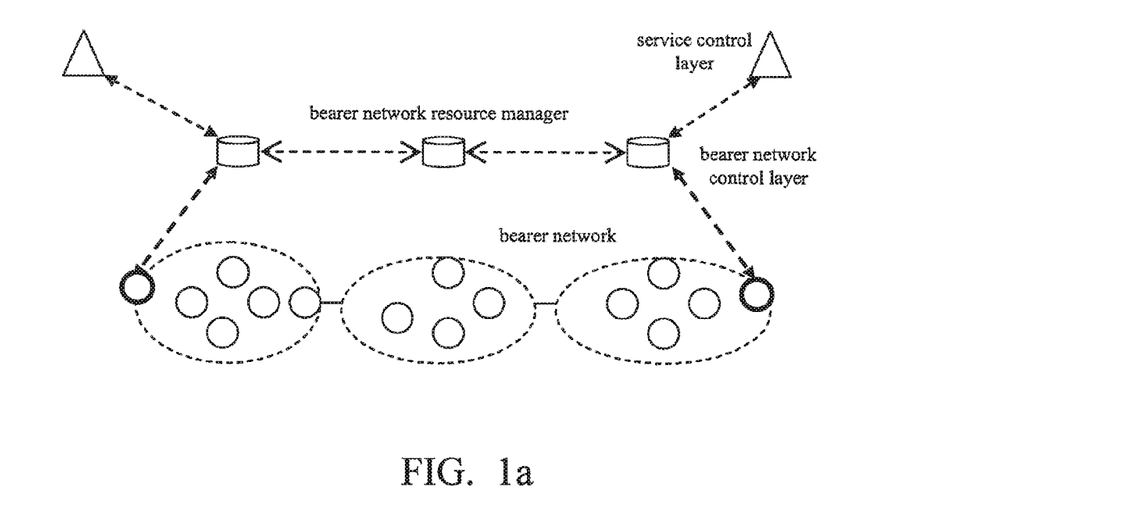
FIG. 1a is a schematic diagram illustrating network structure of communication network according to an embodiment of the present invention.
Figure 1B:
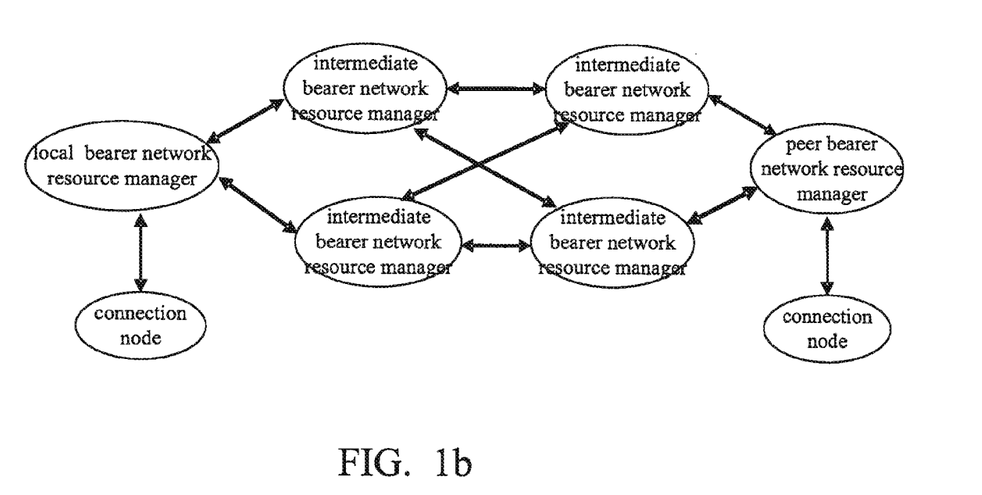
FIG. 1b is a schematic diagram illustrating network structure of bearer network resource manager of communication network according to an embodiment of the present invention.
Figure 2:
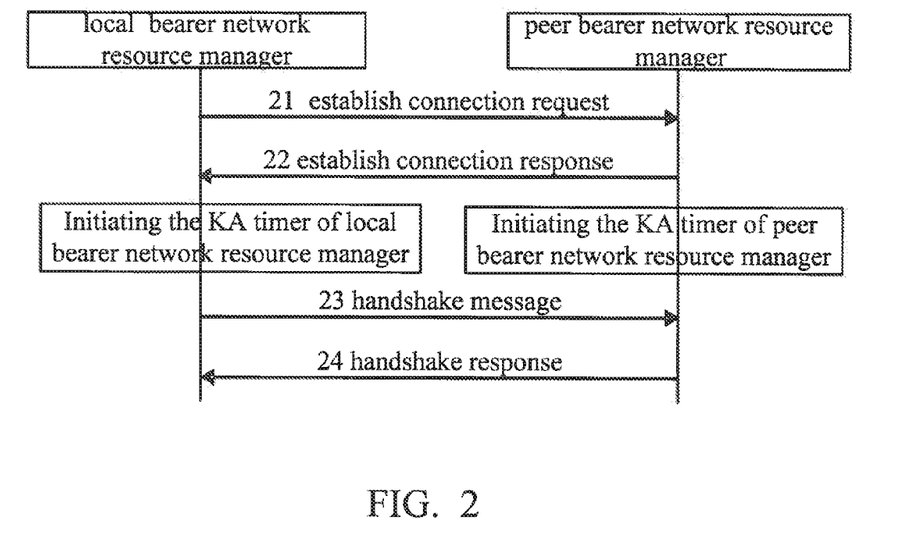
FIG. 2 is flowchart illustrating the procedure of establishing connections according to an embodiment of the present invention.

Now specific embodiment of the present invention will be further illustrated hereinafter with reference to the accompanying drawings, as shown in FIG. 1a, FIG. 1b and FIG. 2, the procedure of establishing QoS connections between bearer network resource manages (CM) comprises the following steps:

Step 21: when it is determined that resources of the bearer network need to be controlled and managed through bearer network resource managers located in the bearer network layer, initial local bearer network resource manager will send an Establish Connection Request to initial peer bearer network resource manager, for instance, an "OPEN" message can be sent as an Establish Connection Request requesting to create a QoS connection between local bearer network resource manager and peer bearer network resource manager.

Said Establish Connection Request carries information like: identifier and authentication information of the bearer network resource manager requesting to establish the connection, so that peer bearer network resource manager can authenticate whether to establish the connection according to said authentication information.

Besides, said Establish Connection Request also optionally comprises data consistency information, and said data consistency information is used to guarantee that the message is not distorted during the transmission and to avoid invasion of illegal messages, thereby data consistency message is generally including 32bits KEY_ID, 32bits serial number and 96bits abstract, therein, the KEY_ID is used to identify key value and algorithms shared by both parties, serial number is initialized when "OPEN" message is transmitted, added up orderly when subsequent messages are transmitted and restarted from 0 when overflowed to avoid invasion by illegal messages.

Said local bearer network resource manager is generally configured with management rules required for managing bearer network resources and network topology information of bearer network, which can implement corresponding resource control management functions, like completing resource allocation of corresponding bandwidth request, allocating corresponding path information for service requests in the network and so on.

Bearer network control layer generally comprises multiple bearer network resource manager, like local bearer network resource manager, multiple intermediate bearer network resource managers and peer bearer network resource manager shown in FIG. 1b, said local, intermediate and peer are all in allusion to a specific QoS connection, wherein the initial point of a QoS connection is local bearer network resource manager, the terminal point is peer bearer network resource manager, while those bearer network resource managers through which the messages are transmitted from local bearer network resource manager to peer bearer network resource manager are called intermediate bearer network resource managers. In communication networks, said local bearer network resource manager generally needs to transmit the corresponding message to peer bearer network resource manager through multiple bearer network resource managers, namely that a QoS resource control message has to pass a path from local bearer network resource manager through multiple bearer network resource managers before arriving at peer bearer network resource manager, and finally resource control management at corresponding connection nodes is implemented by peer bearer network resource manager, wherein said connection nodes are usually routers.

Step 22: after receiving the "OPEN" message from local bearer network resource manager, according to the received authentication information and identity identifier, peer bearer network resource manager checks validity of identity of local bearer network resource manager that has sent the connection request, if identity of local bearer network resource manager is valid, peer bearer network resource manager will send an Establish Connection Response to local bearer network resource manager, wherein this Establish Connection Response carries relevant information for establishing the QoS connection, for example, peer bearer network resource manager can send an "ACCEPT" message to local bearer network resource manager as the Establish Connection Response and the "ACCEPT" message carries time-over time span of local Keep Active (KA) timer; if identity of local bearer network resource manager is invalid, peer bearer network resource manager will send a message indicating inability of establishing corresponding connection to local bearer network resource manager, wherein this message carries corresponding reason code that is used to indicate the reason why this connection cannot be established.

While sending the "ACCEPT" message, peer bearer network resource manager also need to initiate the peer KA timer and be in Online state, namely the QoS connection between peer bearer network resource manager and local bearer network resource manager is established.

After receiving the "ACCEPT" message sent by peer bearer network resource manager, local bearer network resource manager will initiate local LA timer and enters Online state, namely the QoS connection between peer bearer network resource manager and local bearer network resource manager is established; if receiving a message of unable to establish corresponding connection sent by peer bearer network resource manager, local bearer network resource manager can resend an Establish Connection Request to peer bearer network resource manager according to specific requirements.

So far, the QoS connection between local bearer network resource manager and peer bearer network resource manager in the bearer network control layer, while step 23 and step 24 represent the control procedure of maintaining the established QoS connection.

Step 23: the timer of local KA will be restarted when time-over, and local bearer network resource manager adds 1 to overtime times of local KA timer so as to calculate overtime times of local KA timer, and meanwhile needs to send a KA message, i.e. a handshake message, to peer bearer network resource manager in order to monitor whether peer bearer network resource manager is in normal connection state.

Step 24: if in normal connection state, after receiving the KA message, peer bearer network resource manager will send a KA message to local bearer network resource manager as the handshake response sent by local bearer network resource manager, restart peer KA timer and maintain the Online state of QoS connection. After receiving the KA message sent by peer bearer network resource manager, local bearer network resource manager will clear overtime times of local KA timer as zero and maintain the Online state of QoS connection.

If local bearer network resource manager does not receive the KA message returned by peer bearer network resource manager all along, overtime times of local KA timer will exceed the settled allowable value, and then local bearer network resource manager will release the established QoS connection. In the same way, if peer bearer network resource manager does not receive the KA message returned by local bearer network resource manager all along, peer KA timer is time-out, and then peer bearer network resource manager will release the established QoS connection. This added QoS connection maintenance mechanism can effectively guarantee that network resource is reasonably occupied by the established QoS connection.

After the QoS connection is established, specific QoS resource control messages can be transferred between local bearer network resource manager and peer bearer network resource manager in bearer network layer of network communication network, so as to control and manage resources of the connection nodes that belong to bearer network resource manager.

A QoS connection in Online state is established after the processing procedure of step 21 to step 24. This QoS connection can bear various kinds of QoS resource control messages, while the QoS resource control messages bear the QoS information for transmitting a certain service in the communication network, and the required QoS information includes the requested bandwidth for a certain service, allowed stream and so on. One embodiment of the method of the present invention will be further illustrated hereinafter with reference to FIG. 3.

Figure 3:
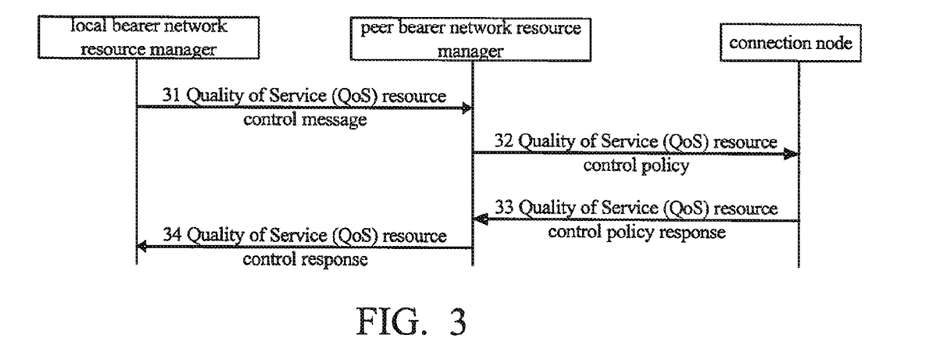
FIG. 3 is a flowchart illustrating the procedure of transferring Quality of Service (QoS) resource control messages according to an embodiment of the present invention.

Step 31: the requested QoS information for control management upon the resources between two connection nodes in the bearer network, namely QoS parameters and other information, is determined, local bearer network resource manager sends a QoS resource control message to peer bearer network resource manager, wherein this resource control message bears the determined QoS information for peer bearer network resource manager to perform resource control management upon corresponding connection nodes.

Meanwhile, local bearer network resource manager also transmits the determined QoS information to the connection nodes managed by local bearer network resource manager. The connection nodes perform resource control management in terms of this service according to the QoS information.

In the communication network, some important services usually request for the transmission services with high priorities or transmitting some services according to specified bandwidth, etc. Therefore, resources of corresponding connection nodes in the bearer network need to be controlled and managed according to specific demands, so as to meet the transmission requirement of corresponding service, namely to control and manage the resources between the start connection node and terminal connection node of the service.

QoS information of the communication network is generally transmitted to bearer network resource manager of bearer control layer by the service control layer in the network, and then is transferred among the bearer network resource managers.

Step 32: after receiving the QoS resource control message sent by local bearer network resource manager, peer bearer network resource manager will send the QoS control policy, which is determined according to the QoS resource control message, to the connection node, including QoS policy install command and relevant information.

Step 33: after receiving the QoS control policy, the connection nodes of peer bearer network resource manager will perform corresponding resource control and management operation, and send a response in allusion to the QoS control policy to the peer bearer network resource manager.

Step 34: after receiving the response in allusion to the QoS control policy sent by the underlying connection node and relevant information, peer bearer network resource manager will send a QoS resource control response to local bearer network resource manager, so that local bearer network resource manager can accurately get to know whether the corresponding QoS resource control message is reliably received, and whether corresponding resource control management operation is performed at corresponding connection node.

After the processing procedure of step 31 to step 34, necessary QoS resource control messages can be transferred between two connection nodes concerned with a certain specific transmission service in the bearer network.

Figure 4:
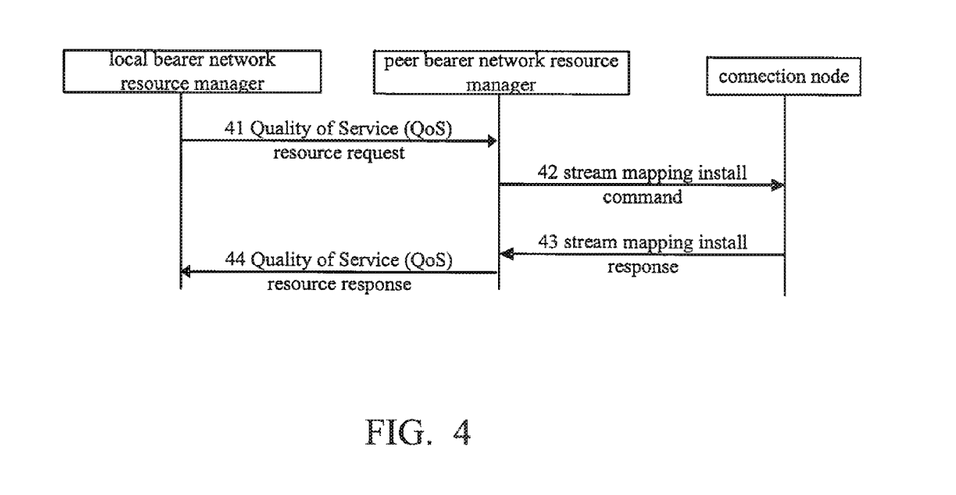
FIG. 4 is a flowchart illustrating the procedure of allocating QoS resources according to an embodiment of the present invention.

In order to transfer QoS resource control messages between local bearer network resource manager and peer bearer network resource manager, QoS resource must be requested to allocate, as shown in FIG. 4, the procedure of processing QoS resource request is as follows:

Step 41: when receiving the to-be-transmitted QoS information sent by service control layer, local bearer network resource manager needs to initiate a QoS resource request to peer bearer network resource manager at first, namely to send a QoS resource request to peer bearer network resource manager, and then step 42 is executed.

Information carried by the QoS resource request includes:

If the QoS resource request is sent to CM by CA, it comprises: connection Identifier (ID), stream information, QoS parameter, flow descriptor, and it can comprise data consistency information optionally;

If the QoS resource request is bilateral and transferred between CM, it comprises: connection ID, stream information, QoS parameter, flow descriptor, Label Switching Path (LSP) connection information, and it can further comprise data consistency information optionally;

If the QoS resource request is unilateral and transferred between CM, it comprises: connection ID, stream information, QoS parameter, flow descriptor, LSP connection information, and it can further comprise data consistency information optionally.

Step 42: after receiving the QoS resource request sent by local bearer network resource manager, peer bearer network resource manager will perform service routing and resource allocation, and send QoS resource request to the connection nodes that belong to peer bearer network resource manager, namely sending QoS policy install command to the connection node.

If the messages need to be transferred from local bearer network resource manager to peer bearer network resource manager through multiple intermediate bearer network resource managers, local bearer network resource manager sends the QoS resource request to the next hop intermediate bearer network resource manager first of all. The intermediate bearer network resource manager performs routing and resource allocation, returns a response towards the QoS resource request to the previous hop intermediate bearer network resource manager or local bearer network resource manager after the resource request is successful and continues to forward the said QoS resource request, until the peer bearer network resource manager receives this QoS resource request, and then the said operation in step 4 is executed.

Step 43: after receiving the QoS policy install command, the connection node will perform corresponding stream mapping install process, and send a response toward the QoS policy install command to peer bearer network resource manager.

Step 44: after receiving the response toward the QoS policy install command sent by connection node, peer bearer network resource manager will send a response of accepting the QoS resource request or rejecting the QoS resource request to the local bearer network resource manager.

Information carried by the QoS resource response includes:

If the response of accepting the QoS resource request is sent to CM by CA, it comprises: connection Identifier (ID), stream information, QoS parameter, flow descriptor, and it can further comprise data consistency information optionally;

If the response of rejecting the QoS resource request is sent to CM by CA, it comprises: connection Identifier (ID) and reason code and it can further comprise data consistency information optionally;

If the response of accepting the QoS resource request is bilateral and sent to CM by CM, it comprises: connection Identifier (ID), stream information, QoS parameter, flow descriptor, LSP information, and it can further comprise data consistency information optionally;

If the response of accepting the QoS resource request is unilateral and sent to CM by CM, it comprises: connection Identifier (ID), stream information, QoS parameter, flow descriptor, LSP information, and it can further comprise data consistency information optionally;

If the response of rejecting the QoS resource request is sent to CM by CM, it comprises: connection Identifier (ID), reason code, and data consistency information optionally.

Figure 5:
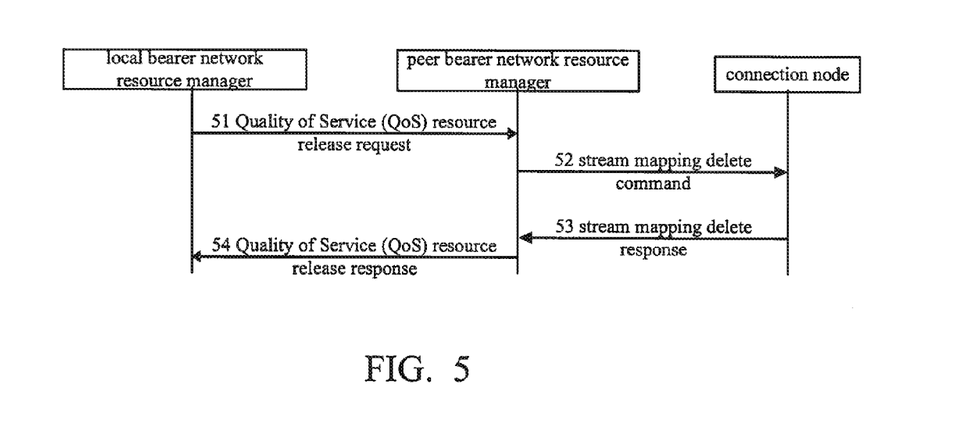
FIG. 5 is a flowchart illustrating the procedure of releasing QoS resources according to an embodiment of the present invention.

After the QoS resources are bored and allocated between local bearer network resource manager and peer bearer network resource manager, when the message transfer procedure is ended or the message transfer cannot be normally performed and the procedure has to be ended due to exceptions in the communication network, the process of releasing the QoS resources has to be performed. The specific processing procedure is shown in FIG. 5, and includes the following steps:

Step 51: when a service communication procedure is ended or the communication cannot be normally performed due to exceptions, local bearer network resource manager needs to send a QoS resource release request to peer bearer network resource manager so as to release the QoS resource allocated for it, meanwhile, local bearer network resource manager also has to send stream mapping delete command to the connection nodes connected to and managed by local bearer network resource manager, and the connection nodes perform corresponding stream mapping delete operation according to the received stream mapping delete demand.

The QoS resource release request carries information including:

If the QoS resource request is transferred between CA and CM, it comprises: connection Identifier (ID) and reason code, and data consistency information optionally;

If the QoS resource request is transferred between CM and CM, it comprises: connection Identifier (ID) and reason code, and data consistency information optionally.

Step 52: after receiving the QoS resource release request sent by local bearer network resource manager, peer bearer network resource manager finishes releasing the QoS resource and meanwhile sends delete QoS control policy command, i.e. stream mapping delete command, to the connection nodes connected to and managed by peer bearer network resource manager, and then step 53 is executed.

Step 53: the connection nodes receive the steam mapping delete command set by peer bearer network resource manager, and send stream mapping delete command response to peer bearer network resource manager after finishing corresponding stream mapping delete operation.

Step 54: after receiving the stream mapping delete command response sent by affiliated connection nodes, peer bearer network resource manager sends a QoS resource release response to local bearer network resource manager.

Figure 6:
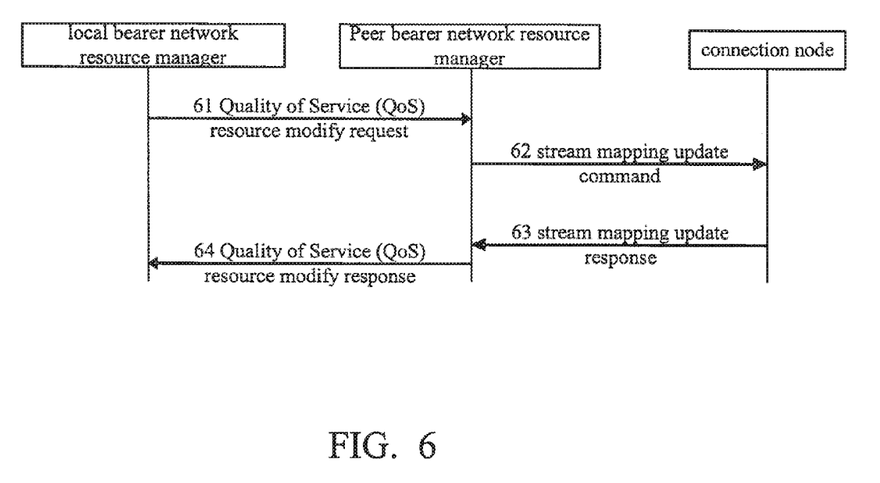
FIG. 6 is a flowchart illustrating the procedure of modifying QoS resources according to an embodiment of the present invention.

After the QoS resources are bored and allocated between local bearer network resource manager and peer bearer network resource manager, the allocated QoS resources may need modification according to practical demand of message transfer procedure, like adjusting the allocated bandwidth resources and allowed maximum stream and so on. A specific processing procedure of modifying the QoS resources is shown in FIG. 6, and includes the following steps:

Step 61: when it is needed to modify the allocated QoS resources, local bearer network resource manager sends a QoS resource modify request to peer bearer network resource manager. The QoS resource modify request carries the to-be-modified QoS resource identifier and the modified QoS resource information and so on. Meanwhile, local bearer network resource manager needs to send QoS resource modify message, namely stream mapping update message, to the connection nodes under its control and management. The connection nodes perform corresponding stream mapping update operations according to the received stream mapping update command, so that the QoS resource is modified.

Step 62: after receiving the QoS resource modify request sent by local bearer network resource manager, peer bearer network resource manager sends stream mapping update command to the connection nodes under its control and management according to the information carried in the QoS resource modify request.

If the QoS resource modify request of local bearer network resource manager has to pass multiple intermediate bearer network resource managers before arriving at the peer bearer network resource manager, each intermediate bearer network resource manager receiving the QoS resource modify request will forward the QoS resource modify request to the next intermediate bearer network resource manager, until peer bearer network resource manager receives this QoS resource modify request, and then step 62 will be executed.

The QoS resource modify request carries information including parameter global Path Maximum Transmission Unit (PATH MTU), global label stack depth, intra-domain label stack depth, stream descriptor and so on.

Step 63: after receiving the stream mapping command sent by peer bearer network resource manager and performing corresponding steam mapping update operation, the connection nodes will send stream mapping update command response to peer bearer network resource manager.

Step 64: after receiving the stream mapping update command response sent by the connection node, peer bearer network resource manager learns that QoS resource modification is successful and will send a QoS resource modify response to local bearer network resource manager.

Figure 7:
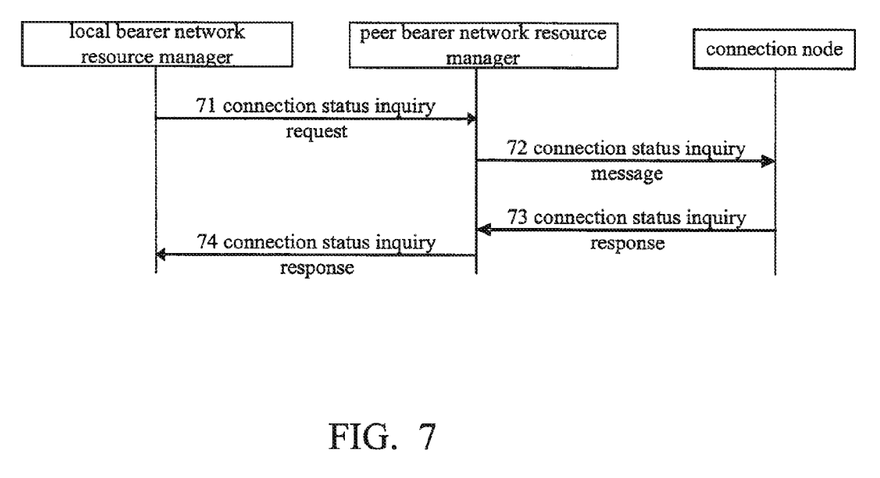
FIG. 7 is a flowchart illustrating the procedure of inquiring QoS connection status according to an embodiment of the present invention.

To guarantee connection status consistency of both ends of the established QoS connection, namely to guarantee synchronization of resources on both ends of the QoS connection, and thereby implement reliable transfer of QoS resource control messages, the disclosed method further includes a processing procedure of checking the status of the QoS connection established between local bearer network resource manager and peer bearer network resource manager. The specific procedure of checking the QoS connection status is shown in FIG. 7, and includes the following steps:

Step 71: local bearer network resource manager sends a connection status inquiry request to peer bearer network resource manager periodically or according to settled condition, wherein the connection status inquiry request carries connection status information of local bearer network resource manager, meanwhile, local bearer network, resource manager sends connection status inquiry request to the connection nodes under its control and management, and corresponding connection node will return QOS connection resource status to local bearer network resource manager after receiving the connection status inquiry request, and then local bearer network resource manager checks QoS resource consistency according to the connection resource status sent by the connection node.

Step 72: after receiving the connection status inquiry request sent by local bearer network resource manager, peer bearer network resource manager will initiate connection status inquiry to the connection node under its control and management, namely that peer bearer network resource manager will send connection status inquiry message to the connection node.

Step 73: after receiving the connection status inquiry request, the connection node will send a connection status inquiry response to peer bearer network resource manager, such that the connection node will return QoS connection resource status of the connection node to peer bearer network resource manager.

Step 74: peer bearer network resource manager checks the QoS resource consistency according to the QoS connection resource status returned by the connection node, and returns a connection status inquiry request to local bearer network resource manager, namely that peer bearer network resource manager returns a connection status inquiry report to local bearer network resource manager.

If the interaction between peer bearer network resource manager and local bearer network resource manager has to pass multiple intermediate bearer network resource managers, the intermediate bearer network resource manager need to return a connection status inquiry report to the previous bearer network resource manager after receiving the connection status inquiry request.

The connection status inquiry report carries information including:

If CM sends the connection status inquiry report to CA, the connection status inquiry report comprises: connection ID, connection resource status, and it can further comprise data consistency information optionally;

If CM sends the connection status inquiry report to CM, the connection status inquiry report comprises: connection ID, connection resource status, and it can further comprise data consistency information optionally.

In accordance with the disclosed method, when the messages need to be transferred from local bearer network resource manager to peer bearer network resource manager through multiple intermediate bearer network resource managers, the intermediate bearer network resource managers only play the message transfer role, without needing to send corresponding messages to the connection nodes under its control and management just as local bearer network resource manager and peer bearer network resource manager do.

In a word, the above-description is just a preferable embodiment of the present invention, not used to confine the protection scope of the present invention.

The invention claimed is:

1. A method for providing reliable transmission Quality of Service (QoS) in a communication network, the method comprising:

A. a local bearer network resource manager sending an establish connection request to a peer bearer network resource manager for requesting to create a QoS connection between the local bearer network resource manager and the peer bearer network resource manager;

B. the local bearer network resource manager receiving an establish connection response from the peer bearer network resource manager so as to create the QoS connection;

C. the local bearer network resource manager periodically sending a handshake message to the peer bearer network resource manager, and determining a connection status according to a handshake response returned by the peer bearer network resource manager; and D. the local bearer network resource manager transmitting QoS information to the peer bearer network resource manager through the QoS connection, wherein the QoS information is provided to connection nodes connected to the local bearer network resource manager and the peer bearer network resource manager respectively for providing a corresponding resource;

wherein C comprises,

C1. creating a local Keep Active (KA) timer at the local bearer network resource manager, and creating a peer Keep Active (KA) timer at the peer bearer network resource manager, C2. when the local KA timer is timed out, the local bearer network resource manager adding 1 to timeout times of the local KA timer and sending a further handshake message to the peer bearer network resource manager, C3. after receiving the further handshake message, the peer bearer network resource manager restarting the peer KA timer and returning a handshake response to the local bearer network resource manager, and C4. the local bearer network resource manager determining the connection status according to the timeout times of the local KA timer, the peer bearer network resource manager determining the connection status according to whether the peer KA timer is timed out.

2. The method according to claim 1, wherein the local bearer network resource manager and the peer bearer network resource manager are located in a bearer control layer of a multiservice network.

3. The method according to claim 1, further comprising: the peer bearer network resource manager judging whether an identity of the local bearer network resource manager is valid, and if valid, sending the establish connection response to the local bearer network resource manager.

4. The method according to claim 1, wherein information carried in the establish connection request comprises identification information and authentication information of the local bearer network resource manager initiating the establish connection request.

5. The method according to claim 1, wherein information carried in the handshake message comprises connection ID information and connection resource state information.

6. The method according to claim 1, further comprising: the peer bearer network resource manager managing and controlling resources of the connection nodes connected to the peer bearer network resource manager according to the received QoS information.

7. The method according to claim 1, further comprising: the local bearer network resource manager sending a QoS resource control message that carries the QoS information to the peer bearer network resource manager.

8. The method according to claim 7, wherein the QoS resource control message comprises QoS resource request information, which comprises connection identification, stream information, QoS parameters or a stream descriptor.

9. The method according to claim 7, wherein the QoS resource control message comprises a QoS resource release request, which comprises a connection identifier or a reason code.

10. The method according to claim 7, wherein the QoS resource control message comprises a QoS resource modify request, which comprises a connection identifier and modified parameter information corresponding to the QoS connection.

11. The method according to claim 7, wherein the QoS resource control message comprises a connection status inquiry message, the method further comprises:

the peer bearer network resource manager sending a QoS resource control policy to the connection nodes, which is connected to the peer bearer network resource manager according to the QoS resource control message;

the peer bearer network resource manager receiving a response of the QoS resource control policy from the connection nodes connected to the peer bearer network resource manager;

the peer bearer network resource manager checking resource consistency of the QoS connection; and the peer bearer network resource manager returning a response of the connection status inquiry message to the local bearer network resource manager.

12. The method according to claim 11, wherein the information carried in the response of the connection status inquiry message includes any one or more of the following: a connection identifier, stream information, QoS parameters, a stream descriptor, a label stack, a path maximum transmission unit, and a bearer network resource manager stack.

13. The method according to claim 1, wherein the local bearer network resource manager and the peer bearer network resource manager are a bandwidth broker, a call agent, or a connection manager.

14. A communication network comprising:

a first bearer network resource manager; and a second bearer network resource manager in communication with the first bearer network resource manager;

wherein the first bearer network resource manager is configured to, send an establish connection request to the second bearer network resource manager for requesting to create a QoS connection between the first bearer network resource manager and the second bearer network resource manager, receive an establish connection response from the second bearer network resource manager so as to create the QoS connection, transmit QoS information through the QoS connection to the second bearer network resource manager, and wherein the first bearer network resource manager is further configured to periodically send a handshake message to the second bearer network resource manager, and to determine a connection status according to a handshake response returned by the second bearer network resource manager;

create a first Keep Active (KA) timer, add 1 to timeout times of the first KA timer and send a further handshake message to the second bearer network resource manager when the first KA timer is timed out, wherein the second bearer network resource manager is configured to, create a second Keep Active (KA) timer, restart the second KA timer and return a handshake response to the first bearer network resource manager after receiving the further handshake message, and wherein the first bearer network resource manager and the second bearer network resource manager are configured to control and manage resources according to the QoS information.

15. The communication network according to claim 14, wherein the second bearer network resource manager is configured to judge whether an identity of the first bearer network resource manager is valid, and if valid, send the establish connection response to the first bearer network resource manager.

* * * * *